US012032088B2

(12) United States Patent
Brett et al.

(10) Patent No.: US 12,032,088 B2
(45) Date of Patent: Jul. 9, 2024

(54) DEVICE FOR RADAR SENSOR, IC FOR A RADAR SENSOR AND A RADAR SENSOR

(71) Applicant: NXP USA, Inc., Austin, TX (US)

(72) Inventors: Maik Brett, Taufkirchen (DE); Ryan Haoyun Wu, San Jose, CA (US); Arunesh Roy, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 145 days.

(21) Appl. No.: 16/879,476

(22) Filed: May 20, 2020

(65) Prior Publication Data
US 2020/0408891 A1 Dec. 31, 2020

(30) Foreign Application Priority Data
Jun. 26, 2019 (EP) .................... 19182650

(51) Int. Cl.
G01S 13/34 (2006.01)
G01S 7/00 (2006.01)
(Continued)

(52) U.S. Cl.
CPC .............. *G01S 7/006* (2013.01); *G01S 7/023* (2013.01); *G01S 7/0232* (2021.05);
(Continued)

(58) Field of Classification Search
CPC ........ G01S 7/006; G01S 7/023; G01S 7/0232; G01S 7/0235; G01S 13/345;
(Continued)

(56) References Cited

U.S. PATENT DOCUMENTS 4,429,312 A * 1/1984 Chisholm ............... G01S 13/86
342/410
7,187,321 B2 3/2007 Watanabe et al.
(Continued)

FOREIGN PATENT DOCUMENTS

DE 102017216435 A1 3/2019
EP 1821118 A1 8/2007
(Continued)

OTHER PUBLICATIONS

Aydogdu et al., "Radar Communication for Combating Mutual Interference of FMCW Radars," downloaded from https://arxiv.org/pdf/1807.01497.pdf, Apr. 28, 2020, 6 pages.

*Primary Examiner* — Timothy A Brainard
*Assistant Examiner* — Ismaaeel A. Siddiquee

(57) ABSTRACT

A device for a radar sensor is disclosed, the device comprising: transmission circuitry configured to generate transmission signals with a linear frequency chirp modulation in a predetermined frequency band for output to a radar antenna; reception circuitry configured to receive reflection signals corresponding to reflection of the transmitted radar signals from one or more physical objects; and control circuitry configured to select a frequency range within said predetermined frequency band and/or a timing pattern for said transmission signals; wherein said device is configured to: receive a further signal from a further radar sensor; determine, from said further signal, a frequency range and/or timing pattern in use by said further radar sensor for transmission of further transmission signals; and select a frequency range within said predetermined frequency band and/or a timing pattern for said transmission signals which does not conflict with the frequency range and/or timing pattern of said further transmission signals.

13 Claims, 5 Drawing Sheets

(51) Int. Cl.
*G01S 7/02* (2006.01)
*G01S 13/931* (2020.01)
*G01S 7/03* (2006.01)
*H04B 1/04* (2006.01)
*H04B 1/16* (2006.01)
*H04B 1/69* (2011.01)
*H04W 4/38* (2018.01)

(52) U.S. Cl.
CPC .......... *G01S 7/0235* (2021.05); *G01S 13/345* (2013.01); *G01S 13/931* (2013.01); *G01S 7/022* (2013.01); *G01S 7/032* (2013.01); *G01S 13/343* (2013.01); *G01S 2013/9316* (2020.01); *H04B 1/04* (2013.01); *H04B 1/16* (2013.01); *H04B 1/69* (2013.01); *H04B 2001/6912* (2013.01); *H04W 4/38* (2018.02)

(58) Field of Classification Search
CPC ................... G01S 13/931; G01S 7/032; G01S 2013/9316; G01S 13/343; G01S 7/022; H04B 1/04; H04B 1/16; H04B 1/69; H04B 2001/6912; H04W 4/38
See application file for complete search history.

(56) References Cited

U.S. PATENT DOCUMENTS

| | | | |
|---|---|---|---|
| 10,234,540 B2 | 3/2019 | Kim | |
| 2003/0128100 A1* | 7/2003 | Burkhardt | G08B 21/0222 340/572.1 |
| 2005/0111415 A1* | 5/2005 | Soomro | H04W 24/00 370/338 |
| 2007/0008108 A1* | 1/2007 | Schurig | G01S 5/06 340/539.11 |
| 2007/0120731 A1 | 5/2007 | Kelly Jr. et al. | |
| 2011/0291875 A1 | 12/2011 | Szajnowski et al. | |
| 2012/0099583 A1* | 4/2012 | Li | H04W 56/0085 370/350 |
| 2012/0313814 A1* | 12/2012 | Kojima | G01S 7/0232 342/201 |
| 2016/0061935 A1 | 3/2016 | Mccloskey et al. | |
| 2016/0381589 A1* | 12/2016 | Zhang | H04L 5/0053 370/252 |
| 2017/0215205 A1* | 7/2017 | Takeda | H04W 16/14 |
| 2019/0212437 A1* | 7/2019 | Mayer | B60Q 1/0023 |
| 2019/0378356 A1* | 12/2019 | Fang | G07C 5/008 |
| 2020/0088838 A1* | 3/2020 | Melzer | G01S 7/352 |
| 2020/0182995 A1* | 6/2020 | Zeng | G01S 7/006 |
| 2021/0156982 A1* | 5/2021 | Stettiner | G01S 7/0232 |
| 2021/0329572 A1* | 10/2021 | Que | G01S 5/0284 |
| 2022/0082655 A1* | 3/2022 | Gao | G01S 7/0235 |

FOREIGN PATENT DOCUMENTS

| | | |
|---|---|---|
| EP | 1826586 A1 | 8/2007 |
| JP | H06160512 A | 6/1994 |

* cited by examiner

DEVICE FOR RADAR SENSOR, IC FOR A RADAR SENSOR AND A RADAR SENSOR

BACKGROUND

The present specification relates to a device for a radar sensor, an IC for a radar sensor, and a radar sensor. In particular, but not exclusively, it relates to a device for a radar sensor, an IC for a radar sensor, and a radar sensor, configured to reduce or avoid interference between different radar sensors.

With the rapidly increasing adoption rate of radar sensors for ADAS (advanced driver-assistance system) functionality in cars, such as emergency braking, and the trend to use radar sensors as an essential part of autonomous driving systems, the potential failure of these sensors due to mutual interference has become a matter of concern. The frequency regulations for the 77 GHz frequency band commonly used by these sensors neither restrict the modulation scheme nor define procedures for collaborative operation of multiple applications in that band.

Interference between two similar radar sensors can be very strong, since an 'aggressor' sensor may radiate directly into a 'victim' sensor. Direct radiation from an 'aggressor' sensor at the 'victim' sensor interferes non-coherently, with power decreasing as $1/R_{int}^2$, where $R_{int}$ is the distance between the two sensors. In contrast, the reflection signal to be detected coherently by the 'victim' sensor from a target a distance R away decreases as $1/R^4$. In addition, power absorption by the target (i.e. the reflection cross section or RCS) further reduces the power of the reflection signal. In some cases, the reflection signal from the target may be undetectable due to a high interference signal level. Due to the similarity of the waveforms of the radar signals emitted by the sensors, and to the high stability of the oscillators of the sensors, the interference can persist for a significant time.

The effect of interference typically manifests as detected signal values exceeding the normal signal range for target reflection. Resulting problems include saturation of receiver modules, signal range limitations leading to additional harmonics (ghost targets), masking of weaker targets in the same range, and an increase in overall noise floor before detection.

Many analyses show that the impact of interference on the radar sensor function can be severe and ranges from reduced detection sensitivity due to presence of additional noise, up to complete failure of intended detection function. Different waveforms have been proposed to overcome this problem, such as PMCW (phase modulated continuous wave) and OFDM (orthogonal frequency division multiplexing) waveforms, which support additional coding to distinguish several transmitters in the same frequency band and minimize mutual interference by orthogonality properties of such codes. The downside of these proposals is that they require the design of new transceiver architectures with more challenging design requirements than the widely used FCM (fast chirp modulation) waveform. The latter is widely used because of its simplicity of implementation paired with its capability for high resolution. The interaction of such new modulation schemes with existing FCM sensors is another of source of concern in the industry. Yet further proposals are based on the use of another communication channel, such as V2X.

SUMMARY

Aspects of the present disclosure are set out in the accompanying independent and dependent claims. Combination of features from the dependent claims may be combined with features of the independent claims as appropriate and not merely as set out in the claims.

According to an aspect of the present disclosure, there is provided a device for a radar sensor comprising:
transmission circuitry configured to generate transmission signals with a linear frequency chirp modulation in a predetermined frequency band for output to a radar antenna, and
reception circuitry configured to receive reflection signals corresponding to reflection of the transmitted radar signals from one or more physical objects, and
control circuitry configured to select a frequency range within said predetermined frequency band and/or a timing pattern for said transmission signals;
wherein said device is configured to:
receive a further signal from a further radar sensor;
determine, from said further signal, a frequency range and/or timing pattern in use by said further radar sensor for transmission of further transmission signals; and
select a frequency range within said predetermined frequency band and/or a timing pattern for said transmission signals which does not conflict with the frequency range and/or timing pattern of said further transmission signals.

Accordingly, the device may be useful in reducing or avoiding interference between different radar sensors. By being configured to determine a frequency range and/or timing pattern in use by a further radar sensor for transmission of further transmission signals and to select a frequency range within said predetermined frequency band and/or a timing pattern for said transmission signals which does not conflict with the frequency range and/or timing pattern of said further transmission signals, a plurality of such devices operating in the same predetermined frequency band may select spectrum usage to minimise interference.

The timing pattern may be defined by a scan period, scan offset, and/or duty cycle of said transmission signals. The frequency range and/or timing pattern selected for said transmission signals may be non-overlapping with the frequency range and/or timing pattern respectively of said further transmission signals.

The reception circuitry may be configured to listen for said further signal from said further radar sensor prior to output by said transmission circuitry of said transmission signals.

Accordingly, a device is able to check whether a frequency range and/or timing pattern intended for use for said transmission signals is in conflict with another radar sensor, prior is to output of said transmission signals, thereby reducing the likelihood of interference with a further radar sensor.

The further signal received from said further radar sensor may be a beacon signal transmitted in said predetermined frequency band, said beacon signal comprising information indicating a frequency range and/or timing pattern of said further transmission signals. The information may include, for example, a start frequency and frequency variation (or start frequency and stop frequency), scan period and duty cycle.

However, in some embodiments the further signal may also or alternatively comprise the further transmission signals transmitted by the further sensor.

That is, the radar sensor may be configured to determine a frequency range and/or timing pattern in use by the further radar sensor for transmission of the further transmission signals, based on the further transmission signals themselves. This may be useful in situations in which the further radar sensor is not operating according to the same protocol as the radar sensor and does not transmit a beacon signal comprising information indicating a frequency range and/or timing pattern of said further transmission signals. The radar sensor may nonetheless be configured to determine a frequency range and/or timing pattern in use by the further radar sensor based on the further transmission signals themselves, and to subsequently select a frequency range within said predetermined frequency band and/or a timing pattern for its own transmission signals which does not conflict with the frequency range and/or timing pattern of said further transmission signals.

The transmission circuitry may be further configured to output a beacon signal comprising information indicating a frequency range and/or timing pattern of said transmission signals, prior to outputting said transmission signals.

The device may be configured to delay output of said beacon signal by a random time period.

Delaying output of said beacon signal by a random time period may be useful in reducing the likelihood of simultaneous transmission of beacon signals by two different radar signals.

The beacon signal may be output within said predetermined frequency band.

Accordingly, it is not necessary to provide a dedicated signalling channel for transmission of information between devices. In some embodiments, said beacon signal is transmitted at a predetermined frequency, for example the centre frequency of the predetermined frequency band.

The beacon signal may be output within said frequency range selected by the device for transmission of said transmission signals.

For example, the beacon signal may be transmitted at the centre of said selected frequency range. Outputting the beacon signal within said selected frequency range may be useful in simplifying operation of the device.

The beacon signal may have a constant carrier frequency.

The information may be encoded in the beacon signal using xPSK or xFSK modulation.

A first portion of said beacon signal may comprise information for synchronising said radar sensor with said further radar sensor, and a second portion of said beacon signal comprises said information indicating a frequency range and/or timing pattern of said transmission signals.

Synchronising said radar sensor with said further radar sensor may comprise determining a difference frequency between an internal clock frequency of said radar sensor and an internal clock frequency of said further radar sensor. Said internal clock frequencies of said radar sensor and said further radar sensor may correspond to respective carrier frequencies of said transmission signals and said further transmission signals. Synchronising said radar sensor with said further radar sensor may comprise determining a symbol frequency of said beacon signal.

In some embodiments, said beacon signal comprises a third portion comprising information indicating one or more frequency ranges and/or timing patterns in use by one or more respective further radar sensors.

The reception circuitry may further comprise decoding circuitry for decoding said information from said beacon signal, wherein a carrier frequency of a received beacon signal is not synchronised with an internal clock frequency used by said reception circuitry.

The decoding circuitry may comprise a digital demodulator and/or a Goertzel frequency bank.

The radar sensor may be configured, on receiving said beacon signal from said further radar sensor, to decode said first portion of said beacon signal to synchronize said radar sensor with the further radar sensor, and next to decode said second portion of said beacon signal.

The device may further comprise memory configured to store information indicating a frequency range and/or timing pattern of said further transmission signals transmitted by said at least one further radar sensor.

The beacon signal output by said transmission circuitry may further comprise said information indicating a frequency range and/or timing pattern of said further radar signal. The information may include, for example, a start frequency and frequency variation (or start frequency and stop frequency), scan period and duty cycle.

The device may be configured to delete information relating to a further radar sensor after storage for a predetermined time period.

The timing pattern may be defined at least in part by a scan period, duty cycle and/or start time of the transmission signals.

According to another aspect of the present disclosure, there is provided a radar sensor, comprising:
 a radar transmission antenna;
 a radar reception antenna; and
 a device as defined above.

The radar sensor may be installed in or on a road vehicle.

According to another aspect of the invention, there is provided a road vehicle comprising a radar sensor as defined above.

According to another aspect of the invention, there is provided an IC for a radar sensor, the IC comprising transmission circuitry configured to generate transmission signals with a linear frequency chirp modulation in a predetermined frequency band for output to a radar antenna, and further configured to generate a beacon signal comprising information indicating a frequency range and/or timing pattern of said transmission signals, for output to said radar antenna prior to outputting said transmission signals.

According to another aspect of the invention, there is provided an IC for a radar sensor, the IC comprising reception circuitry configured:
  to receive reflection signals corresponding to reflection from one or more physical objects of radar signals transmitted by said radar sensor in a predetermined frequency band, and
  to listen for a further signal from a further radar sensor prior to transmission by said radar sensor of said transmission signals, said further signal being a beacon signal transmitted in said predetermined frequency band, said beacon signal comprising information indicating a frequency range and/or timing pattern in use by said further radar sensor for transmission of further transmission signals.

The IC may further comprise decoding circuitry for decoding said information from said beacon signal, wherein a carrier frequency of said beacon signal is not synchronised with an internal clock frequency used by said IC.

Said decoding circuitry may comprise a digital demodulator and/or a Goertzel frequency bank.

Embodiments of this disclosure may use radar frequencies typically in the range of, but not necessarily limited to, 76 GHz to 81 GHz.

DETAILED DESCRIPTION

Figure 1:
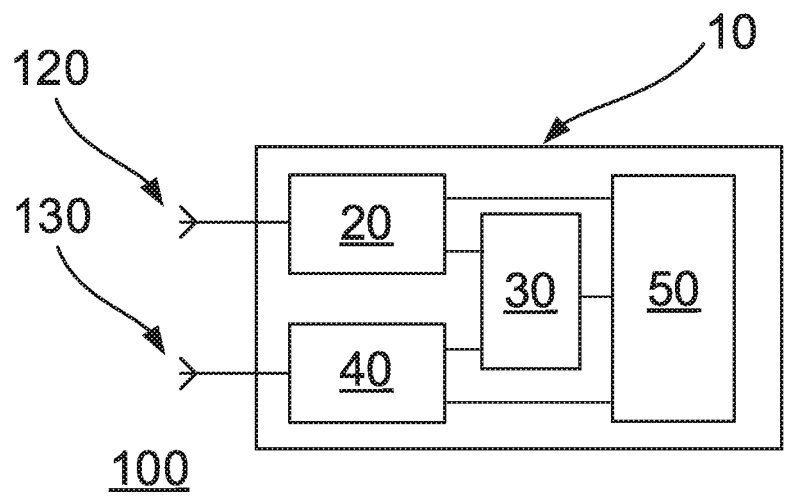
FIG. 1 illustrates a frequency modulated continuous wave (FMCW) radar sensor 100 according to an embodiment of this disclosure.

FIG. 1 illustrates a frequency modulated continuous wave (FMCW) radar sensor 100 according to an embodiment of this disclosure. The radar sensor 100 includes a device 10, a radar transmission antenna 120 and a radar reception antenna 130. The device 10 comprises transmission circuitry 20, 30 configured to generate transmission signals with a linear frequency chirp modulation in a predetermined frequency band for output to the radar transmission antenna 120, and reception circuitry 30, 40 configured to receive reflection signals, via the radar reception antenna 130, corresponding to reflection of the transmitted radar signals from one or more physical objects. The device 10 further comprises control circuitry 50 in communication with the transmission circuitry 20, 30 and reception circuitry 30, 40. The control circuitry 50 is configured to select a frequency range within the predetermined frequency band and/or a timing pattern for the transmission signals.

Figure 2:
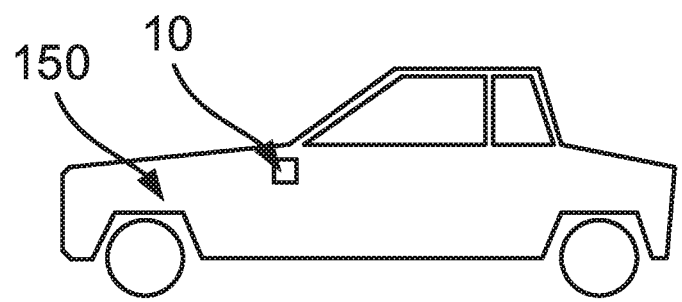
FIG. 2 illustrates a road vehicle including a radar sensor of the kind shown in FIG. 1, in accordance with an embodiment of this disclosure.

FIG. 2 illustrates a road vehicle 150 including a radar sensor 100 of the kind shown in FIG. 1, in accordance with an embodiment of this disclosure. The road vehicle may be, for example, a car, van, truck, lorry, motor bike or any other kind of road vehicle. As is known in the art, FMCW radar sensors can be used to obtain information (e.g. distance information, velocity information) about objects located in the vicinity of a road vehicle incorporating the radar sensor. The objects may typically also be other road vehicles. The other road vehicles may themselves also include one or more FMCW radar sensors.

Figure 3:
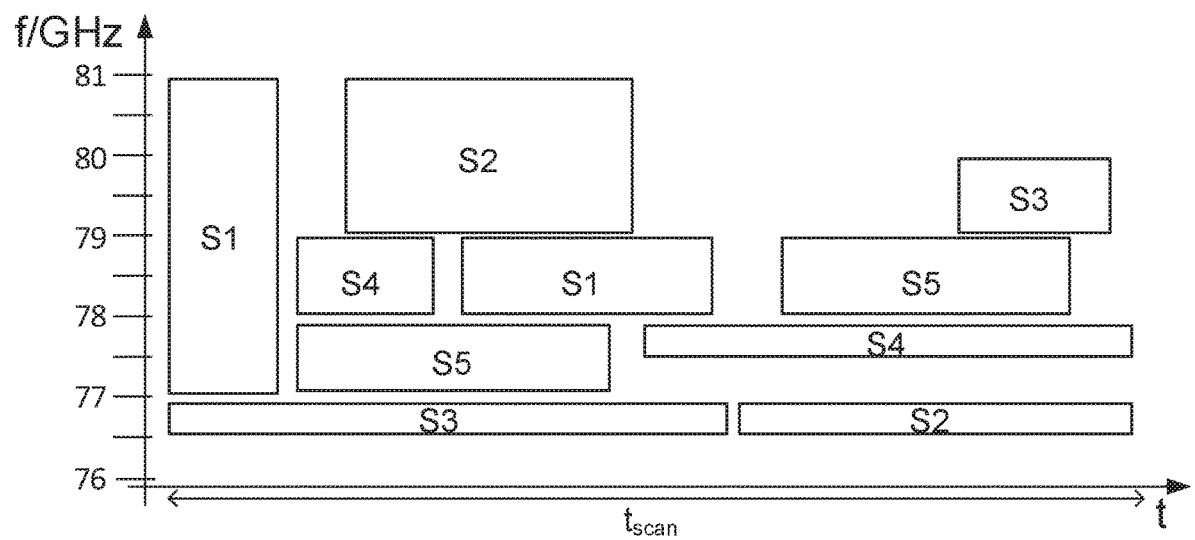
FIG. 3 illustrates an example scheme for time- and frequency-division multiplex operation of a plurality of radar sensors according to an embodiment of this disclosure.

FIG. 3 illustrates an example scheme for time and frequency division multiplex operation of a plurality of such radar sensors 100 transmitting in the 76 GHz to 81 GHz frequency band. Spectrum usage by five different radar sensors S1, S2, S3, S4 and S5 is represented by blocks occupying a region of frequency and time. For each block, the vertical position and height of the block indicate the frequency range in use by the respective radar sensor, while the horizontal position and width of the block indicate the time and duration respectively of active transmission in that frequency range by the respective radar sensor over the course of a single scan period $t_{scan}$.

In this example, each of the sensors S1, S2, S3, S4 and S5 operates two scans within the scan period $t_{scan}$, which is typically of the order of 50 ms. It is possible to align or synchronise the scan periods of the individual sensors S1, S2, S3, S4 and S5, as will be described later.

Typically, a transmission bandwidth of up to 4 GHz is only needed for short-range scans, for which relatively high range resolution is required. For long-range to mid-range scans, lower range resolution is acceptable and the bandwidth required is typically 0.5 to 1 GHz. As a result, the frequency band can be divided into sub-bands allowing concurrent use by multiple sensors. Multiple frequency sub-bands can be used simultaneously and interference-free by several sensors. A small headroom between frequency sub-bands can be maintained by controlling the chirp modulation.

At the same time, a radar sensor usually only transmits during part of a scan period. That is, the transmission period or CPI (coherent processing interval) of the radar sensor is shorter than the scan period $t_{scan}$. The duty cycle is generally up to 50% for the highest resolution scans, and is typically between 20% and 30% for lower resolution scans. Typically, shorter scan times are used for higher bandwidth scans and vice versa, due to the trade-off between range resolution (increasing with bandwidth) and Doppler resolution (increasing with scan time). As a result, it is often possible to perform time-multiplexing for any sub-band of the frequency band. For example, a 50% duty cycle allows two sensors to share the same frequency band, while a 30% duty cycle allows three sensors to share the same frequency band. The allocation of the frequency band into sub-bands can change over the course of a scan period.

The sensors S1 to S5 illustrated in FIG. 3 are all multi-mode sensors capable of performing scans at more than one bandwidth to achieve different resolutions as required. At the start of the scan period, sensor S1 operates a short-range, 4 GHz bandwidth scan using a 77-81 GHz frequency range or sub-band of the 76 to 81 GHz frequency band. At the same time, sensor S3 starts a long-range, 0.5 GHz bandwidth scan, using the 76.5-77 GHz frequency range or sub-band. Once the first scan by sensor S1 has completed, sensors S2, S4 and S5 each start scans having respective bandwidths of 2 GHz (frequency range 79-81 GHz), 1 GHz (frequency range 78-79 GHz) and 1 GHz (frequency range 77-78 GHz), collectively using the 77-81 GHz frequency range previously used by sensor S1. Following completion of the 1 GHz bandwidth scan in the 78-79 GHz sub-band by sensor S4, the 78-79 GHz sub-band is reused for 1 GHz bandwidth scans by sensor S1 and then sensor S5. Following completion of the 2 GHz bandwidth scan in the 79-81 GHz sub-band by sensor S2, a part of this sub-band is used by sensor 3 which performs a 1 GHz bandwidth scan using a 79-80 GHz sub-band. Similarly, the 1 GHz bandwidth scan by sensor S5 using the 77-78 GHz range is followed by a 0.5 GHz scan by sensor S4 using the 77.5-78 GHz frequency range. Following the long-range 0.5 GHz bandwidth scan by sensor S3 in the 76.5-77 GHz sub-band, this sub-band is reused by sensor S2 for another 0.5 GHz bandwidth scan. The scheme described above is an example only, and the skilled person will appreciate that many other subdivisions and allocations of a frequency band in both time and frequency are possible to avoid interference between multiple radar sensors. In some embodiments, sensors with a high-bandwidth and long duty cycle may be given priority over sensors with low bandwidth and short duty cycle.

In order for multiple radar sensors 100 to cooperatively allocate the available frequency band, the device 10 is configured to receive a further signal from a further radar sensor (not shown), to determine, from said further signal, a frequency range and/or timing pattern in use by the further radar sensor for transmission of further transmission signals, and to select a frequency range within the predetermined frequency band and/or a timing pattern for its own transmission signals which does not conflict with the frequency range and/or timing pattern of the further transmission signals. For example, the device 10 may select a different frequency sub-band from that used by the further radar sensor so that it uses a frequency range which does not overlap that of the further radar sensor. Alternatively (or additionally) the device 10 may select a different timing pattern from that used by the further radar sensor, for example by shifting the start of its active transmission period so that it does not overlap that of the further radar sensor. As a result, interference between the two radar sensors can be eliminated.

Figure 4:
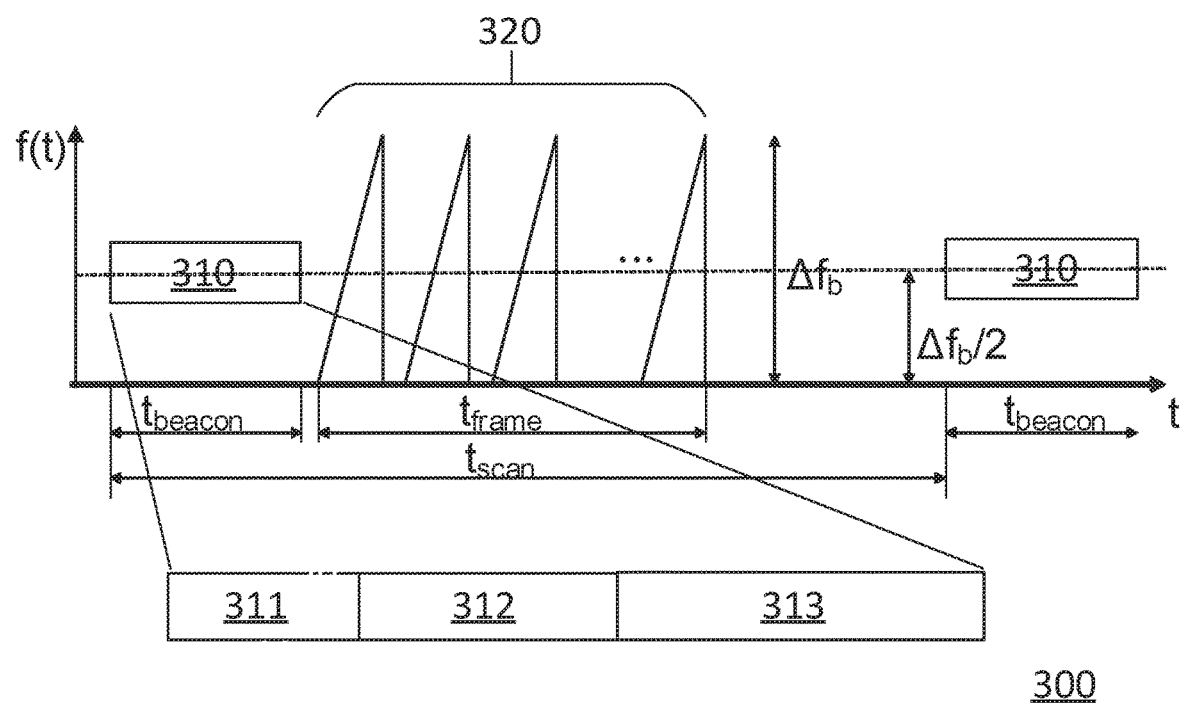
FIG. 4 illustrates a signalization scheme for use by the device 10 of the radar sensor 100 according to an embodiment of this disclosure.

FIG. 4 illustrates a signalization scheme 300 for use by the device 10 of the radar sensor 100 for achieving interference-free allocation of the predetermined frequency band. In this embodiment, in-band signalization is used.

Each sensor 100 following the signalization scheme 300 initially 'listens' in the predetermined frequency band before it starts talking. This may be achieved by simple, uncorrelated radar measurement and spectrum analysis. The listening time may be limited to a duration of the order of 1-2 scan periods (for example, 100 ms).

If the predetermined frequency band, or a portion of it, is discovered to be available, the device 10 generates a beacon signal 310 which is transmitted by the transmission antenna 120 of the radar sensor 100 during a time interval $t_{beacon}$. The carrier frequency of the beacon signal is within the predetermined frequency band. In some embodiments, the beacon signal carrier frequency is located at a predetermined frequency, for example at the centre of the predetermined frequency band, or at the middle of the sub-band currently in use or intended for use by the transmitting radar sensor 100. The beacon signal 310 may be transmitted with a predefined output power, e.g. 3 dBm. A first portion 311 of the beacon signal 310 is a code synchronization portion 311 used for synchronizing the clocks of potentially interfering radar sensors 100 (also known as 'clock run in'). The code synchronization portion 311 comprises a few a priori known symbols which are decoded by a remote radar sensor receiving the beacon signal 310 for synchronization with the radar sensor 100 transmitting the beacon signal 310. The clocks of different radar sensors 100 are uncorrelated, and it is therefore necessary to establish some degree of time synchronization in order to perform time-multiplex division of a scan period. High precision is not required for synchronizing the clocks. The radar sensors 100 may be loosely synchronised to each other, for example to around 1 ms, which provides sufficient accuracy for timing the time slots of a scan period of the order of 50 ms. A second portion 312 of the beacon signal 310 comprises information indicating a frequency range and/or timing pattern intended for use by the radar sensor 100 for its transmission signals. For example, the frequency range may be defined by a frequency start value and range value. For example, the timing pattern may be defined by scan parameters such as the scan period, duty cycle, and/or active transmission start time. Further information such as chirp duration, number of chirps, output power and other waveform details (e.g. up/down scan) may also be included. A third portion 313 of the beacon signal 310 comprises entries 1 . . . N of a service allocation table (SAT). The SAT is stored locally by the radar sensor 100 and includes the parameters of other scans and of other sensors detected by the radar sensor 100. The SAT is continuously updated by the radar sensor 100, and entries have a maximum lifetime. Although not essential, broadcasting the entries of the SAT stored locally by the radar sensor 100 is useful in that it makes sensor discovery easier for other radar sensors.

After transmitting the beacon signal 310, the radar sensor 100 proceeds to transmit a chirp sequence 320 for a time interval $t_{frame}$, using the frequency range $\Delta f_b$ and/or timing pattern comprised in the second portion 312 of the transmitted beacon signal 310. The chirp sequence illustrated in FIG. 4 is a FCM (fast chirp modulation) sequence. After the current scan period $t_{scan}$ ends, the radar sensor 100 transmits another beacon signal 310 before commencing the next chirp sequence.

Figure 5:
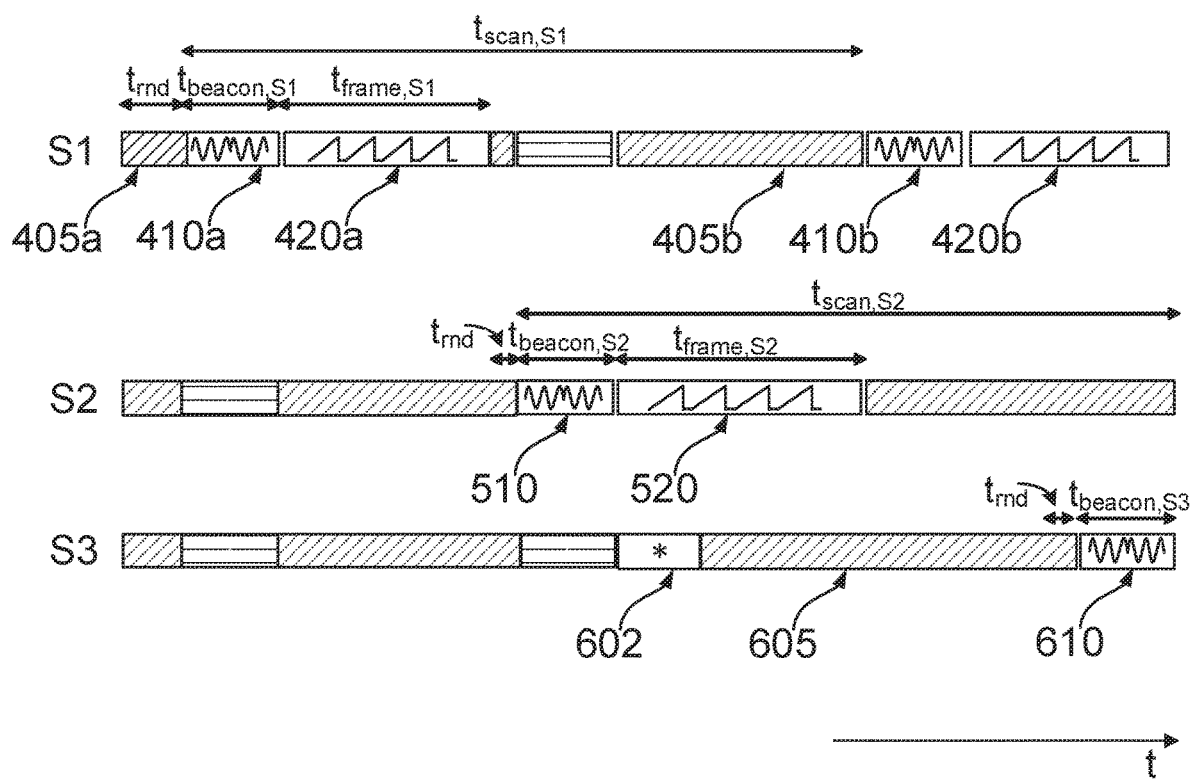
FIG. 5 illustrates use by multiple sensors of a signalization scheme similar to that shown in FIG. 4.

FIG. 5 illustrates the use by multiple sensors S1, S2, and S3 of a signalization scheme similar to that shown in FIG. 4. Initially, sensor S1 is active with a scan period $t_{scan,S1}$ and duty-cycle of around 50% in a first sub-band of the predetermined frequency band, while sensors S2 and S3 are searching for unallocated bandwidth and/or time within the same predetermined frequency band. Sensor S1 initially completes a period of listening 405a, then broadcasts a beacon signal 410a for a duration $t_{beacon,S1}$, before transmitting a chirp sequence 420a having a frame length $t_{frame,S1}$ in the first sub-band. The beacon signal 410a includes information indicating the sub-band, scan period $t_{scan,S1}$ and frame length $t_{frame,S1}$ used by sensor S1. During broadcast of the beacon signal 410a, the other two sensors S2 and S3 are listening in the predetermined frequency band and detect and decode the beacon signal 410a broadcast by sensor S1. Both sensors S2 and S3 update their respective SAT (service allocation table) to include the information decoded from the beacon signal 410a, and select a frequency range and timing pattern for their own transmission signals which does not conflict with that of sensor S1. In this example, each of the sensors S2 and S3 determines that the duty cycle of sensor S1 is less than 50% and that it can therefore use the same frequency sub-band as sensor S1. Sensors S2 and S3 continue to listen throughout the duration of the chirp sequence 420a of sensor S1, and prepare to start broadcasting a beacon signal once sensor S1 silences and after an additional random time period $t_{rnd}$. This random time period $t_{rnd}$ provides arbitration between the two sensors S2 and S3 on a first-come-first-served basis. On this occasion, sensor S2 uses a shorter random time period than S3 and therefore starts broadcasting a beacon signal 510 while sensor S3 is still is in listening mode. The beacon signal 510 is transmitted during a time interval $t_{beacon,S2}$ and includes information indicating the sub-band, scan period $t_{scan,S2}$ and frame length $t_{frame,S2}$ to be used by sensor S2. Sensor S2 then proceeds to transmit a chirp sequence 520 having frame length $t_{frame,S2}$ in the first sub-band (i.e. the same sub-band as used by sensor S1). Since the chirp sequence 520 transmitted by sensor S2 does not overlap in time with the chirp sequence 420a transmitted by sensor S1, there is no interference between sensors S1 and S2. The beacon signal 510 transmitted by sensor S2 is detected and decoded by each of the sensors S1 and S3. Both sensors S1 and S3 update their respective SAT to include the information decoded from the beacon signal 510. Sensor S1, on discovering the presence of sensor S2 using the same frequency sub-band, may adjust its scan period. For example, sensor S1 may increase its own scan period to enable sensor S2 to transmit in the same frequency sub-band, in particular if only a small increase is required. As an example, if sensor S2 transmits a beacon signal indicating that it intends to transmit a chirp sequence with a 20 ms frame length, and sensor S1 is currently transmitting for a 31 ms frame length within a 50 ms scan period, sensor S1 may increase its scan period to 51 ms to allow both sensors S1 and S2 to transmit in the same frequency sub-band. Sensor S1 listens throughout the duration of the chirp sequence 520 of S2, then starts its next scan period by transmitting another beacon signal 410b and its next chirp sequence 420b. Meanwhile, on decoding the beacon signal 520 broadcast by sensor S2, sensor S3 determines that the first sub-band used by sensors S1 and S2 is now fully allocated to S1 and S2. Sensor S3 therefore selects a second sub-band or frequency range and switches to this second sub-band during time interval 602 before initiating a period of listening 605 in the selected second sub-band. At the end of this listening period 605, sensor S3 transmits a beacon signal 610 during a time interval $t_{beacon,S3}$. The beacon signal 610 includes information indicating the sub-band (i.e. the second sub-band), scan period $t_{scan,S3}$ and frame length $t_{frame,S3}$ to be used by sensor S3. Subsequent to transmission of the beacon signal 610, sensor S3 will transmit a chirp sequence in the selected second sub-band. The second sub-band used by sensor S3 does not overlap with the first sub-band used by sensors S1 and S2 and therefore does not cause any interference between the sensors.

The sensors S1, S2 and S3 may also detect transmission signals transmitted by radar sensors which do not operate according to the above scheme, and which therefore do not switch frequency sub-band or timing pattern to avoid interference. In such cases, sensors S1, S2 and S3 may determine a frequency range and/or timing pattern in use by another sensor by spectral analysis of the transmission signals, and select a different frequency sub-band and/or timing pattern accordingly to avoid or reduce interference.

The skilled person will appreciate that various methods are available for encoding information in the beacon signal. A beacon modulation method may be selected with regard to minimization of interference and simplicity of information coding and recovery.

For example, BPSK (binary phase-shift keying) and QPSK/QAM-4 (quadrature phase-shift keying/quaternary quadrature amplitude keying) are well suited to this application. Both are easy to implement using phase rotators in the transmission circuitry 20, 30 of the device 10 using constant power for each symbol, may use a simple decode mechanism, and present low interference with FCM (fast chirp modulation) due to non-coherent integration. However, in order to decode the information encoded in the beacon signal, it is necessary to perform non-coherent demodulation, due to a phase offset between the transmitting and receiving radar sensors and lack of frequency synchronization between the transmitting and receiving radar sensors.

FSK (frequency shift keying) is another option for encoding the beacon signal, as it is compatible with most transceiver implementations and a simple decoder even with incoherent detection. Although FSK is considered to be less robust than PSK (phase shift keying) methods due to a higher error rate, this can be mitigated with additional error coding (e.g. Viterbi) or by using a reduced data rate.

Figure 6:
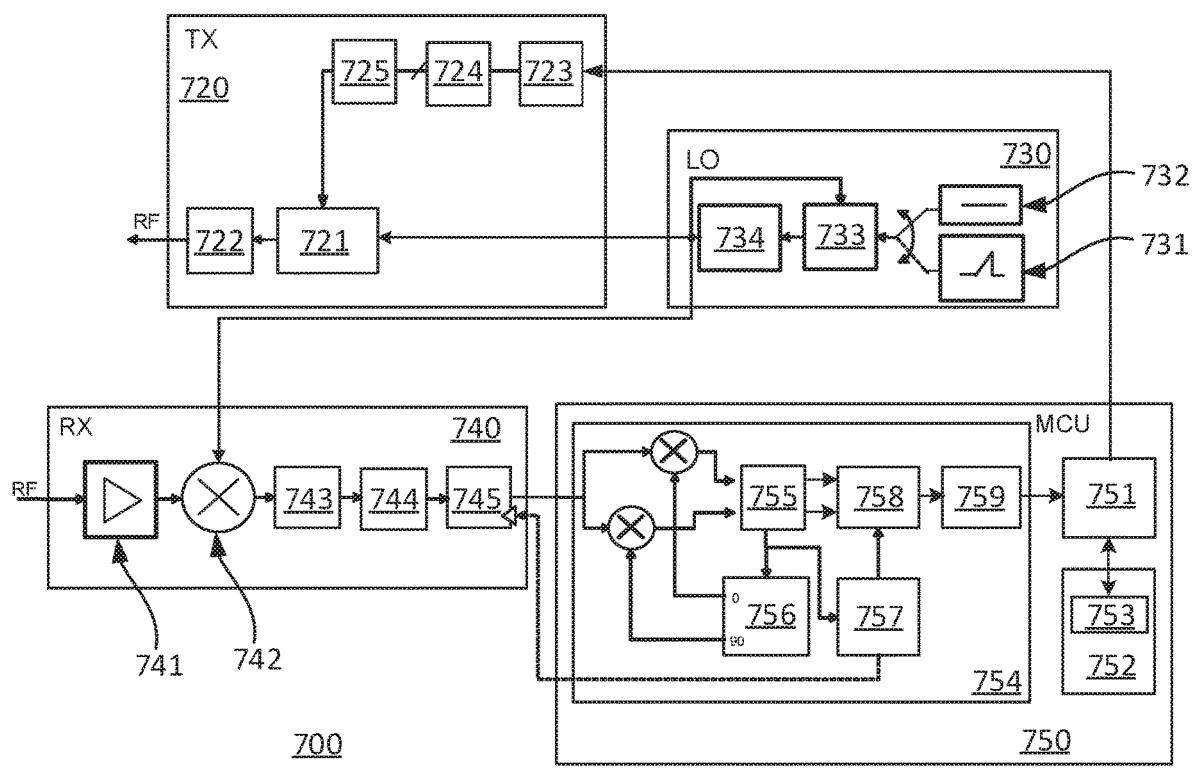
FIG. 6 is a schematic representation of a device for a radar sensor in accordance with an embodiment of this disclosure.

FIG. 6 is a schematic representation of a device 700 for a radar sensor 100 in accordance with an embodiment of this disclosure. The device 700 is in the form of a transceiver 700 implementing xPSK modulation/demodulation for transmission/reception of the beacon signal. The transceiver 700 includes transmission circuitry 720, 730, reception circuitry 730, 740 and control circuitry 750. The transceiver 700 may be implemented as a single IC (integrated circuit), or as a set of ICs.

The transmission circuitry 720, 730 and reception circuitry 730, 740 share a local oscillator (LO) 730. The local oscillator 730 comprises a linear ramp generator 731, a constant voltage source 732, a chirp PLL (phase locked loop) 733 for stabilizing frequency, and a VCO (voltage controlled oscillator) 734. The VCO 734 has an input arranged to receive an output of the chirp PLL 733. The chirp PLL 733 includes a first input arranged to selectively receive an output of the ramp generator 731 or an output of the constant voltage source 732, and a second input connected to the output of the VCO 734. The divide factor of the chirp PLL 733 is selectively controlled by the output of the ramp generator 731 or the output of the constant voltage source 732 so that the output of the VCO 734 has a frequency that is respectively either increasing/decreasing for use in producing a frequency chirp for radar measurements, or constant for use in producing a beacon signal.

The transmission circuitry 720, 730 includes a transmitter (TX) 720 comprising a phase rotator 721 having a first input arranged to receive an output of the VCO 734, and an RF power amplifier 722 having an input connected to an output of the phase rotator 721 and arranged to output transmission signals to a radar antenna. The transmitter 720 further comprises a beacon data buffer 723 arranged to receive data from a processor 751 of the control circuitry 750, a symbol encoder 724 having an input connected to an output of the beacon data buffer 723, and a D/A (digital-to-analog) converter 725 having an input connected to an output of the symbol encoder 724. The phase rotator 721 has a second input arranged to receive an output of the D/A converter 725. The phase rotator 721 may be, for example, a 1-bit phase rotator for enabling BPSK, or a 4-bit phase rotator for enabling QPSK/4-QAM. Although only one transmission channel is shown, the device 10 may include multiple transmitters 720 to provide multiple transmission channels and may be used for power combining.

The control circuitry 750, in the form of an MCU 750 includes a processor 751, which may include multiple processor cores, and memory 752 in the form of RAM for storing the SAT (service allocation table) 753. The control circuitry 750 also includes a digital demodulator 754, which will be described in more detail below. The control circuitry 750 may be integrated with the transceiver circuitry 720, 730, 740, or provided as a separate device. The processor 751 is configured to translate the entries of the SAT 753 into beacon data which is transferred to the beacon data buffer 723 before the start of the beacon transmit period $t_{beacon}$.

During the beacon transmit period, the chirp PLL 733 receives a constant voltage input from the constant voltage source 732, such that the chirp PLL 733 and VCO 734 generate a fixed frequency which is about mid-band. The symbols preloaded in the beacon data buffer 723 are read and encoded by the symbol encoder 724 according to the details of modulation scheme (e.g. DPSK). The encoded symbols output by the symbol encoder 724 are D/A converted by the D/A converter 725 and provided to the phase rotator 721. The phase rotator 721 shifts the phase of the signal output by the VCO 734 and provides the phase-shifted signal to the power amplifier 722, which in turn drives the transmit antenna. During the chirp transmit period $t_{frame}$, the chirp PLL 733 receives a ramped voltage input from the voltage ramp generator 731 and the transmission circuitry 720, 730 generates a chirp sequence as is well-known in the art.

The reception circuitry 730, 740 includes a receiver (RX) 740 comprising an input amplifier/impedance converter 741 having an input arranged to receive a signal from a radar antenna, an input mixer 742 having a first input connected to the output of the input amplifier/impedance converter 741 and a second input connected to the output of the VCO 734 of the local oscillator 730, a programmable gain amplifier 743 having an input connected to an output of the input mixer 742, a high-pass/anti-alias filter 744 having an input connected to an output of the programmable gain amplifier 743, and an A/D (analog-to-digital) converter 745 having an input connected to an output of the high-pass/anti-alias filter 744. The A/D converter 745 outputs a digital signal to the digital demodulator 754 of the control circuitry or MCU 750. Although only one reception channel is shown, the device 700 may include multiple receivers 740 to provide multiple reception channels, and a combined signal from all reception channels may be used to improve sensitivity.

When receiving a beacon signal from a different radar sensor, detection is non-coherent. This is because the frequency output by the VCO of the transmitting radar sensor is not synchronised to the frequency output by the VCO 734 of the receiving radar sensor 700. However, the frequencies of the both radar sensors are sufficiently stable over the duration of the beacon transmit period, such that the difference between both the frequencies and phases is approximately constant. Typically, the frequency difference between the VCO frequencies of two radar sensors is expected to be of the order of a few MHz and approximately stable for a few milliseconds. This is ensured by the high performance requirements (high linearity, low phase noise) of the transceivers during chirping, and the fact that the chirp PLL of each radar sensor enforces an exact multiple of a local crystal oscillator (XTAL) frequency with constant value (typically accurate to better than +/−50 ppm). In contrast to the stringent requirements for the measurement signals (chirp sequence), the beacon signal may require only one stable frequency for PSK or several stable frequencies for FSK. Also, the beacon period may be a few milliseconds (e.g. 2 ms), which is only a fraction of the time required for a measurement (e.g. 20 ms), so the frequency stability requirement for the beacon signal is imposed for a much shorter time.

Outside of its active transmit time, the device 700 switches to listening mode and the chirp PLL 733 and VCO 734 generate a constant frequency, the chirp PLL 733 receiving a constant voltage at its first input from the constant voltage source 732. Since there is no simple way to synchronise the VCO frequencies of the transmitting and receiving radar sensors, the filtered baseband signal output by the high-pass/anti-alias filter 744 of the receiver 740 will be a combination of message signal (i.e. the content of the beacon signal) and difference frequency signal, that is, the filtered baseband signal will be proportional to $\cos(2\pi \cdot \Delta f \cdot t + p_0 - pm(t))$, where $\Delta f$ is the difference between the VCO frequencies of the local (receiving) and remote (transmitting) radar sensors, $p_0$ is a constant phase shift and $pm(t)$ is a phase shift encoding a message symbol. That is, the xPSK receive constellation diagrams are effectively rotating at the rate of the difference frequency, while the symbol rate is not known exactly. Further demodulation therefore takes place in the digital domain. The decoded packet information output by the digital demodulator 754 can be processed by the processor 751 of the MCU 750. Complex (I/Q) demodulation is used to avoid phase ambiguity. Carrier recovery requires a number of a-priori known symbols to synchronize the local carrier frequency. These known symbols, included in the first portion 311 of the beacon signal 310 are also required to extract the symbol timing. Differential coding techniques (DBPSK, DQPSK) may be used. By encoding symbols of the beacon signal as the difference between the current message symbol and the next message symbol, the need for phase synchronisation between the local receiving radar sensor and the remote transmitting radar sensor is eliminated. Carrier recovery requires a number of a-priori known symbols to synchronize the local carrier frequency. These known symbols, included in the first portion 311 of the beacon signal 310 are also required to extract the symbol timing.

The digital demodulator 754 determines from clock run-in 311 with known symbols the frequency offset $\Delta f$ and generates sin/cos waveforms for mixing with the filtered baseband signal, yielding $s_{dm} = \cos(pm(t) - p0) + j\sin(pm(t) - p0)$, which directly gives the sequence of complex symbols $s_{dm,k}$ comprised in the beacon signal for a discrete $pm(t)$ at $t = kT_s$ where $1/T_s$ is the symbol rate, or with differential coding after calculating $s_{dm,dk} = s_{dm,k} - s_{dm,k-1}$.

The digital demodulator 754 comprises a CRI block 755 receiving the digital output from the A/D converter 745. The CRI block 755 detects the clock run-in with known symbols (i.e. the first portion 311 of the beacon signal 310) and sends this to the carrier recovery block 756. The carrier recovery block 756 is trained with the clock run-in and determines the difference frequency $\Delta f$, so that the sequence of symbols matches best with symbol values from the symbol space. After this loop is locked, the symbol timing extract block 757 determines the optimal symbol timing for low inter-symbol interference and this optimal symbol timing is used by a symbol decoder block 758 to extract the symbols from the output of the CRI block 755. Typically, this can be simplified by oversampling with the A/D converter 745 to get several samples for the same symbol. Optimally, the sampling frequency A/D converter 745 is controlled to be an exact multiple of the symbol rate, e.g. $4 \cdot 1/T_s$. A word packer block 759 packs the extracted symbols output by the symbol decoder block 758 to words and these are provided to the CPU 751 for evaluation. The CPU 751 updates the local SAT 753 with the received data. The digital demodulator 754 may be implemented on DSP (digital signal processor).

Figure 7:
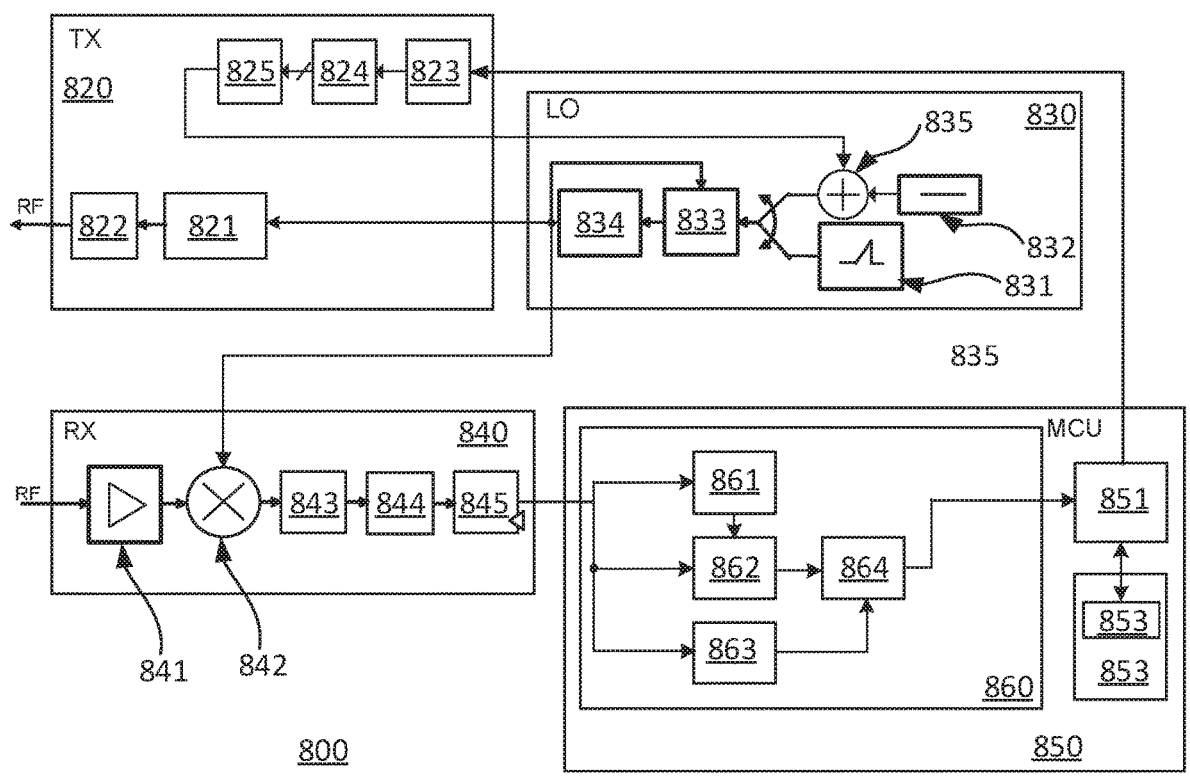
FIG. 7 is a schematic representation of a device for a radar sensor in accordance with an embodiment of this disclosure.

FIG. 7 is a schematic representation of a device 800 for a radar sensor 100 in accordance with a further embodiment of this disclosure. The device 800 is in the form of a transceiver 800 implementing xFSK modulation/demodulation for transmission/reception of the beacon signal. The transceiver 800 includes transmission circuitry, 820, 830, reception circuitry 830, 840, and control circuitry 850. The transceiver 800 may be implemented as a single IC (integrated circuit), or as a set of ICs.

The transmission circuitry 820, 830 and reception circuitry 830, 840 share a local oscillator 830. The local oscillator 830 comprises a linear ramp generator 831, a constant voltage source 832, a chirp PLL 833, a VCO 834 having an input arranged to receive an output of the chirp PLL 833, and a summation node 835 having one of its two inputs connected to the output of the constant voltage source 832. The chirp PLL 833 includes a first input arranged to selectively receive either an output of the ramp generator 831 or an output of a summation node 835. A second input of the chirp PLL 833 is connected to the output of the VCO 834. The divide factor of the chirp PLL 833 is selectively controlled by the output of the ramp generator 831 or the output of the constant voltage source 832 so that the output of the VCO 834 has a frequency that is respectively either increasing/decreasing for use in producing a frequency chirp for radar measurements, or constant for use in producing a beacon signal.

The transmission circuitry 820, 830 includes a transmitter 820 comprising a phase rotator 821 having a first input arranged to receive an output of the VCO 834, and an RF power amplifier 822 connected to an output of the phase rotator 821 and arranged to output transmission signals to a radar antenna. The transmitter 820 further comprises a beacon data buffer 823 arranged to receive beacon data from a processor 851 of the transmission circuitry 850, a symbol encoder 824 having an input connected to an output of the beacon data buffer 823, and a D/A converter 825 having an input connected to an output of the symbol encoder 824, operating as discussed in connection with corresponding elements of the previous embodiment. In this xFSK implementation, the phase rotator 821 is not used for beacon transmission. That is, a constant phase is used. Instead, the output of the D/A converter 825 is received at a second input of the summation node 835. In this way, the symbols of the beacon data are encoded into the beacon signal as frequency steps. The constant voltage source 832 controls the centre frequency of the beacon signal. During the beacon transmit period $t_{beacon}$, the chirp PLL 833 and VCO 834 therefore generate a beacon signal centred on a fixed frequency determined by the constant voltage source 832 and encoding the symbols as frequency shifts. The frequency-shifted signal output by the VCO 834 receives a fixed phase shift from the phase rotator 821 and is amplified by the power amplifier 822, which in turn drives the transmit antenna The control circuitry or MCU 850 includes memory 852 in the form of RAM for storing the SAT (service allocation table) 853, and a CPU 851 configured to translate the entries of the SAT into beacon data which is transferred to the beacon data buffer 823 before the start of the beacon transmit period. The control circuitry 850 also includes a digital demodulator 860, which will be described in more detail below. The MCU 850 may be integrated with the transceiver circuitry 820, 830, 840, or provided as a separate device. Although only one transmission channel is shown, multiple transmission channels may be provided and may be used for power combining.

The reception circuitry 830, 840 includes a receiver 840 comprising an input amplifier/impedance converter 841, an input mixer 842, a programmable gain amplifier 843, a high-pass/anti-alias filter 844 and an A/D converter 845, arranged as for the corresponding elements of the previous embodiment. The A/D converter 845 outputs a digital signal to a digital demodulator 860 implemented in the control circuitry or MCU 850. Although only one reception channel is shown, multiple reception channels may be provided and a combined signal from all reception channels may be used to improve sensitivity.

As described above in connection with the embodiment shown in FIG. 5, detection of a beacon signal from a different radar sensor is non-coherent, with the frequency difference between the VCO frequencies of two radar sensors being typically of the order of a few MHz and approximately stable for a few milliseconds.

Outside of its active transmit time, the device 800 switches to listening mode and the chirp PLL 833 and VCO 834 generate a constant frequency, the chirp PLL 833 receiving a constant voltage at its first input from the constant voltage source 832 via the summation node 835. Frequency steps in the received signal output by the A/D converter 845 are decoded to symbols by Goertzel filter bank or related methods. In the digital demodulator, an offset estimation block 861 determines the difference Δf between the VCO frequencies of the local (receiving) and remote (transmitting) radar sensors using the clock run-in sequence of known symbols (i.e. the first portion 311 of a received beacon signal). This offset estimation is used to adjust filter banks in a Goertzel filter bank block 862. A symbol timing extract block 863 recovers the symbol timing from the clock run-in portion of the beacon signal. The symbols encoded in the beacon signal are then captured from the filter bank block 862 and packed into words by a word packer block 864 using the symbol timing output by the symbol timing extract block 863. The output of the word packer block 864 is provided to the CPU 851 for evaluation. The CPU 851 updates the local SAT 853 with the received data. The digital receiver 860 may be implemented on DSP (digital signal processor).

Although particular embodiments of this disclosure have been described, it will be appreciated that many modifications, additions and/or substitutions may be made within the scope of the claims.

The invention claimed is:

1. A device for a first radar sensor comprising:
generate a first beacon signal and a first transmission signal with a linear frequency chirp modulation, wherein the first beacon signal includes information indicating at least one of a first timing pattern for the first transmission signal and a first frequency range in a predetermined frequency band,
output, to a radar antenna, the first beacon signal during a first part of a scan period, and
output, to the radar antenna, the first transmission signal during a second part of the scan period;
reception circuitry configured to receive reflection signals corresponding to reflection of the first transmission signal from one or more physical objects; and
control circuitry configured to select at least one of the first frequency range within the predetermined frequency band and the first timing pattern for the first transmission signal;
wherein the device is configured to:
receive an indicator signal from a second radar sensor, wherein the indicator signal comprises information indicative of at least one of a second frequency range and a second timing pattern in use by the second radar sensor for transmission of second transmission signals;
determine, based on the indicator signal, the at least one of the second frequency range and the second timing pattern in use by the second radar sensor for transmission of the second transmission signals; and
select the at least one of the first frequency range within the predetermined frequency band and the first timing pattern for the first transmission signals such that the selected at least one of the first frequency range and the first timing pattern are different from a corresponding at least one of the second frequency range and the second timing pattern of the second transmission signals, respectively.

2. A device according to claim 1, wherein the reception circuitry is configured to listen for the indicator signal from the second radar sensor prior to output by the transmission circuitry of the first transmission signals.

3. A device according to claim 1, wherein the indicator signal received from the second radar sensor is a second beacon signal transmitted in the predetermined frequency band.

4. A device according to claim 1, wherein the transmission circuitry is further configured to output the first beacon signal prior to outputting the first transmission signal.

5. A device according to claim 4, wherein the device is configured to delay output of the first beacon signal by a random time period.

6. A device according to claim 4, wherein the first beacon signal is output within the predetermined frequency band.

7. A device according to claim 6, wherein the first beacon signal is output within the first frequency range selected by the device for transmission of the first transmission signal.

8. A device according to claim 4, wherein the first beacon signal has a constant carrier frequency.

9. A device according to claim 3, wherein a first portion of the second beacon signal comprises information for synchronizing the first radar sensor with the second radar sensor, and wherein a second portion of the second beacon signal comprises the information indicative of at least one of the second frequency range and the second timing pattern of the second transmission signals.

10. A device according to claim 4, further comprising memory configured to store information indicative of at least one of the second frequency range and the second timing pattern of the second transmission signals transmitted by the second radar sensor;

wherein the first beacon signal output by the transmission circuitry further comprises the information indicative of at least one of the second frequency range and the second timing pattern of the indicator signal.

11. A device according to claim 1, wherein the first timing pattern is defined at least in part by at least one of the scan period, a duty cycle and a start time of the first transmission signals.

12. A radar sensor, comprising:
a radar transmission antenna;
a radar reception antenna; and
a device according to claim 1.

13. An integrated circuit (IC) for a first radar sensor, the IC comprising:

transmission circuitry configured to:
generate transmission signals with a linear frequency chirp modulation in a first frequency range within a predetermined frequency band and having a first timing pattern for output to a radar antenna during a first part of a scan period; and generate a first beacon signal comprising information indicative of at least one of the first frequency range and the first timing pattern of the transmission signals, for output to the radar antenna during a second part of the scan period that occurs prior to outputting the transmission signals during the first part of the scan period; and receiver circuitry configured to receive a second beacon signal comprising information indicative of at least one of a second frequency range within the predetermined frequency band and a second timing pattern of transmission signals output by a second radar sensor, wherein the at least one of the first frequency range and the first timing pattern are different from a corresponding at least one of the second frequency range and the second timing pattern.

* * * * *